Sept. 6, 1927.
C. P. EISENHAUER
1,641,377
BEARING
Filed Nov. 16, 1925
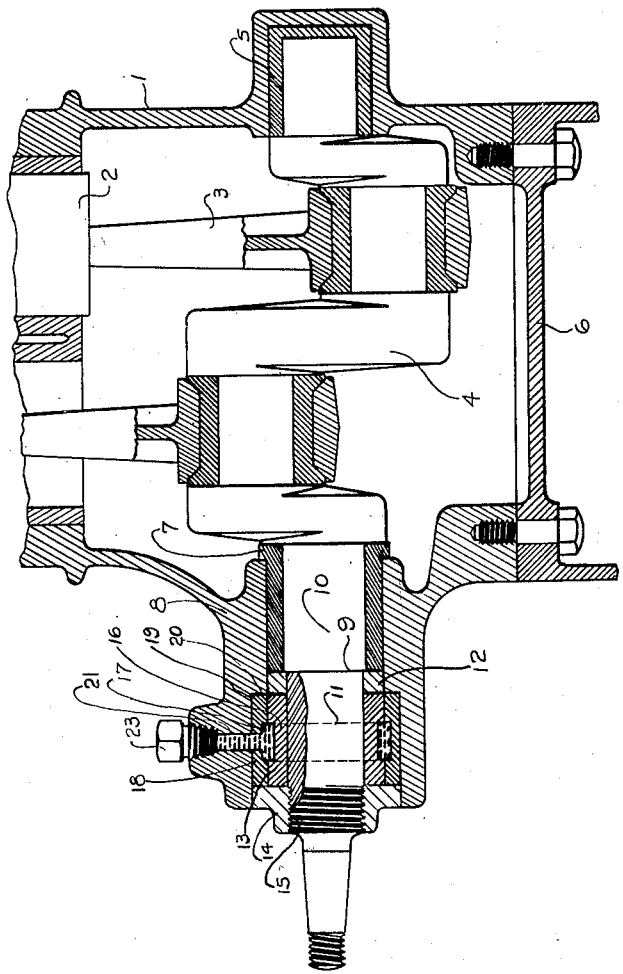
Inventor:
Charles P. Eisenhauer.
BY Toulmin & Toulmin,
ATTORNEY Patented Sept. 6, 1927.

1,641,377

UNITED STATES PATENT OFFICE.

CHARLES P. EISENHAUER, OF DAYTON, OHIO, ASSIGNOR TO THE DURO COMPANY, OF DAYTON, OHIO, A CORPORATION OF OHIO.

BEARING.

Application filed November 16, 1925. Serial No. 69,394.

My invention relates to bearings.

It is the object of my invention to provide a bearing which will be satisfactory for the purpose of supporting a shaft, and which will also be of such a character that there will be no seepage or leaking of gases or liquids along the bearing, from one portion of the shaft to the other.

My invention is particularly adaptable for use in pumps, compressors and the like, handling gases, which it is desired to be confined within the apparatus. The bearing of my invention is useful for supporting the crank shafts of such apparatus, so that there will be no leakage of the surrounding gases to the outside of the apparatus.

Referring to the drawings:

Figure 1 is a section through the crank case of the compressor and a bearing embodying my invention, showing the construction thereof.

Referring to the drawings in detail, 1 is the crank case of the apparatus, which is provided with pistons 2, pitmen 3, and a crank shaft 4. This crank shaft is made of steel and is mounted, at one end, in the crank case 1 in the usual bearing material 5. The bottom of the crank case is closed by a support 6. The other end of the crank shaft rests in bearing material 7 within a crank case sleeve of cast-iron or steel 8. A shoulder 9 is formed on the crank shaft, so that the portion 10 of the crank is of greater diameter than the portion 11.

Adjacent this shoulder in the form of a ring is a steel collar 12, one side of which abuts against the bearing material 7, and the other side of which abuts against a brass or bronze collar 13 surrounding the steel shaft. This collar is retained by an internally-threaded sleeve of steel 14 which is threaded at 15 on the outer end of the shaft 11. This brass or bronze sleeve 13 is provided with a groove 16 which is oppositely disposed from a second groove 17 within a surrounding, co-operating, brass or bronze collar 18, which is carried within a cutaway portion 19 of the sleeve 8, and against a shoulder 20 of the sleeve. The outer end abuts against the internally-threaded sleeve 14.

A hole 21 is drilled through the sleeve 8 in communication with the space formed by the grooves 16 and 17. The upper end of this hole is provided with an internal thread 22 for sleeving the screw plug 23. This hole and the space in the grooves are filled with mercury, which forms an amalgam with the brass or bronze sleeves 13 and 18, but which does not amalgamate with the ferrous material of the sleeve 8, the collar 14 and the ring 12. The result, however, is to provide a seal, due to this amalgamation, between the gases which may be within the crank case 1 and the outside atmosphere, thereby preventing the exit of such gases.

The shaft 10 supported in the bearing 7 has pressed thereon the ring 12 of steel which turns therewith engaging the housing 8. The nonferrous sleeve 13 is also pressed on this shaft 10 abutting the ring 12 and is held in position by the sleeve 14 which is threaded upon the shaft 10 and turns with it so that the ring 12 of steel, the non-ferrous sleeve 13 and the steel sleeve 14 turn together with the shaft. The non-ferrous sleeve 18 carried in the housing 8 is stationary. It is driven into the housing 8 and does not turn therein. The bearing surface is between the sleeve 18 and the sleeve 13 and any line of leakage is between those sleeves. The mercury is employed to seal this line of leakage because of its tendency to amalgamate with the non-ferrous metals which are surrounded by the ferrous metals.

It will be understood that I desire to comprehend within my invention such modifications as may be necessary to adapt it to varying conditions and uses.

Having thus fully described my invention, what I claim as new and desire to secure by Letters Patent, is:—

1. In combination, a chamber adapted to contain a gas, a bearing sleeve in the chamber wall, a shaft mounted therein, a sleeve carried by said shaft having a groove, a second sleeve carried in said bearing sleeve having a groove oppositely disposed from the first mentioned groove, mercury in said grooves, said sleeves being adapted to amalgamate with the mercury there being a passageway through the bearing sleeve and the second sleeve communicating with the grooves for the introduction of mercury therein, means to seal said passageway, and retaining members associated with said sleeves on said shaft.

2. In combination, a chamber adapted to contain a gas, a bearing sleeve in the chamber wall, a shaft mounted therein, a sleeve carried by said shaft having a groove, a second sleeve carried in said bearing sleeve having a groove oppositely disposed from the first mentioned groove, mercury in said grooves, said sleeves being adapted to amalgamate with the mercury there being a passageway through the bearing sleeve and the second sleeve communicating with the grooves for the introduction of mercury therein, means to seal said passageway, and retaining members associated with said sleeves on said shaft, said retaining members consisting of a ring on one side abutting against a shoulder on the shaft, and a threaded sleeve on the other side turning within the bearing sleeve.

3. In combination, a crank case having gas therein which it is desired to prevent from escaping therefrom, a crank shaft journalled in said crank case supporting bearing members for said crank shaft, a bearing sleeve, a shoulder on said crank shaft, a ring engaging said shoulder and also engaging the supporting bearing member in the bearing sleeve, concentric sealing sleeves on said shaft adjacent said ring, one of said concentric sealing sleeves being held in position by a shoulder in the bearing sleeve, a retaining sleeve carried by said shaft on the other side of said concentric members, said concentric members having a reservoir for mercury therebetween adapted to amalgamate therewith, mercury in said reservoir, said bearing sleeve having means for the introduction of mercury thereto, whereby the amalgamation between the concentric members and the amalgamating material will prevent the escape of gases in the crank case through the sleeve.

4. In combination, a chamber adapted to contain a gas, a bearing sleeve in the chamber wall, a shaft mounted therein, a sleeve carried by said shaft having a groove, a second sleeve carried in said bearing sleeve having a groove oppositely disposed from the first mentioned groove, mercury in said grooves, said sleeves being adapted to amalgamate with the mercury and retaining members associated with said sleeves on said shaft.

In testimony whereof, I affix my signature.

CHARLES P. EISENHAUER.